(12) United States Patent
Huang (10) Patent No.: US 8,752,971 B2
(45) Date of Patent: Jun. 17, 2014

(54) COLOR CHANGEABLE LIGHTING KEYBOARD

(75) Inventor: Keng-Wei Huang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 257 days.

(21) Appl. No.: 13/334,166

(22) Filed: Dec. 22, 2011

(65) Prior Publication Data

US 2012/0250328 A1    Oct. 4, 2012

(30) Foreign Application Priority Data

Mar. 30, 2011    (CN) .......................... 2011 1 0083453

(51) Int. Cl.
*F21V 33/00*    (2006.01)

(52) U.S. Cl.
USPC .................................. 362/85; 362/24; 362/88

(58) Field of Classification Search
USPC ......... 362/24, 85, 86, 88, 280, 281, 282, 283, 362/293; 200/310, 311, 312, 313, 314, 315, 200/316, 317
See application file for complete search history.

(56) References Cited

U.S. PATENT DOCUMENTS

| 1,671,072 | A | * | 5/1928 | Gritt | 362/281 |
| 2,623,934 | A | * | 12/1952 | De Bow | 362/293 |
| 4,280,031 | A | * | 7/1981 | Kondo et al. | 200/314 |
| 6,161,944 | A | * | 12/2000 | Leman | 362/281 |
| 7,938,563 | B2 | * | 5/2011 | Hsieh | 362/85 |

* cited by examiner

*Primary Examiner* — Y My Quach Lee
(74) *Attorney, Agent, or Firm* — Rosenberg, Klein & Lee (57) ABSTRACT

A color changeable lighting keyboard includes a housing, a key assembly disposed on the housing, a lighting module disposed in the housing for lighting the key assembly, and a color changing mechanism. The color changing mechanism includes a movable element disposed in the housing and operable to perform a linear motion, and a plurality of colored pieces made of a light-permeable material and having different colors. The movable element is operable to move the colored pieces along a moving direction to align a selected one of the colored pieces with the lighting module.

16 Claims, 8 Drawing Sheets

COLOR CHANGEABLE LIGHTING KEYBOARD

CROSS-REFERENCE TO RELATED APPLICATION

This application claims priority of Chinese Application No. 201110083453.1, filed on Mar. 30, 2011.

BACKGROUND OF THE INVENTION

1. Field of the Invention

This invention relates to a keyboard, and more particularly to a lighting keyboard.

2. Description of the Related Art

Most of conventional lighting keyboards are provided with light emitting diodes within keyboard housings for lighting key caps, in such a manner that light generated within each of the keyboard housings has a fixed color.

Taiwanese Utility Model No. M256532 discloses a lighting keyboard, which is provided with a multi-color luminescent panel for generating multi-color light. However, backlight colors of the lighting keyboard cannot be adjusted.

Taiwanese Invention Patent Application Publication No. 201032152 discloses a lighting keyboard, which is changeable in the color of light generated from the lighting keyboard according to preference and needs of users through software control. Such a software control, however, incurs extra costs, and is cost and time-consuming. Hence, it is desirable that, the backlight color of a lighting keyboard can be adjusted manually without software control.

SUMMARY OF THE INVENTION

The object of this invention is to provide a color changeable lighting keyboard that includes at least one built-in backlight light source and that permits a manual operation to change backlight color without software or circuit control whether it is a wired keyboard or a wireless keyboard.

According to this invention, a color changeable lighting keyboard includes a housing, a key assembly disposed on the housing, a lighting module disposed in the housing for lighting the key assembly, and a color changing mechanism. The color changing mechanism includes a movable element disposed in the housing and operable to perform a linear motion (such as a rotational motion or a straight-line motion), and a plurality of colored pieces made of a light-permeable material and having different colors. The movable element is operable to move the colored pieces along a moving direction to align a selected one of the colored pieces with the lighting module.

The color changeable lighting keyboard has an effect that, the movable element can be operated manually to rotate or move along a straight path so as to change the color of light generated from the color changeable lighting keyboard.

BRIEF DESCRIPTION OF THE DRAWINGS

These and other features and advantages of this invention will become apparent in the following detailed description of two preferred embodiments of this invention, with reference to the accompanying drawings, in which.

DETAILED DESCRIPTION OF THE PREFERRED EMBODIMENT

Before the present invention is described in greater detail in connection with the preferred embodiments, it should be noted that similar elements and structures are designated by like reference numerals throughout the entire disclosure.

Figure 1:
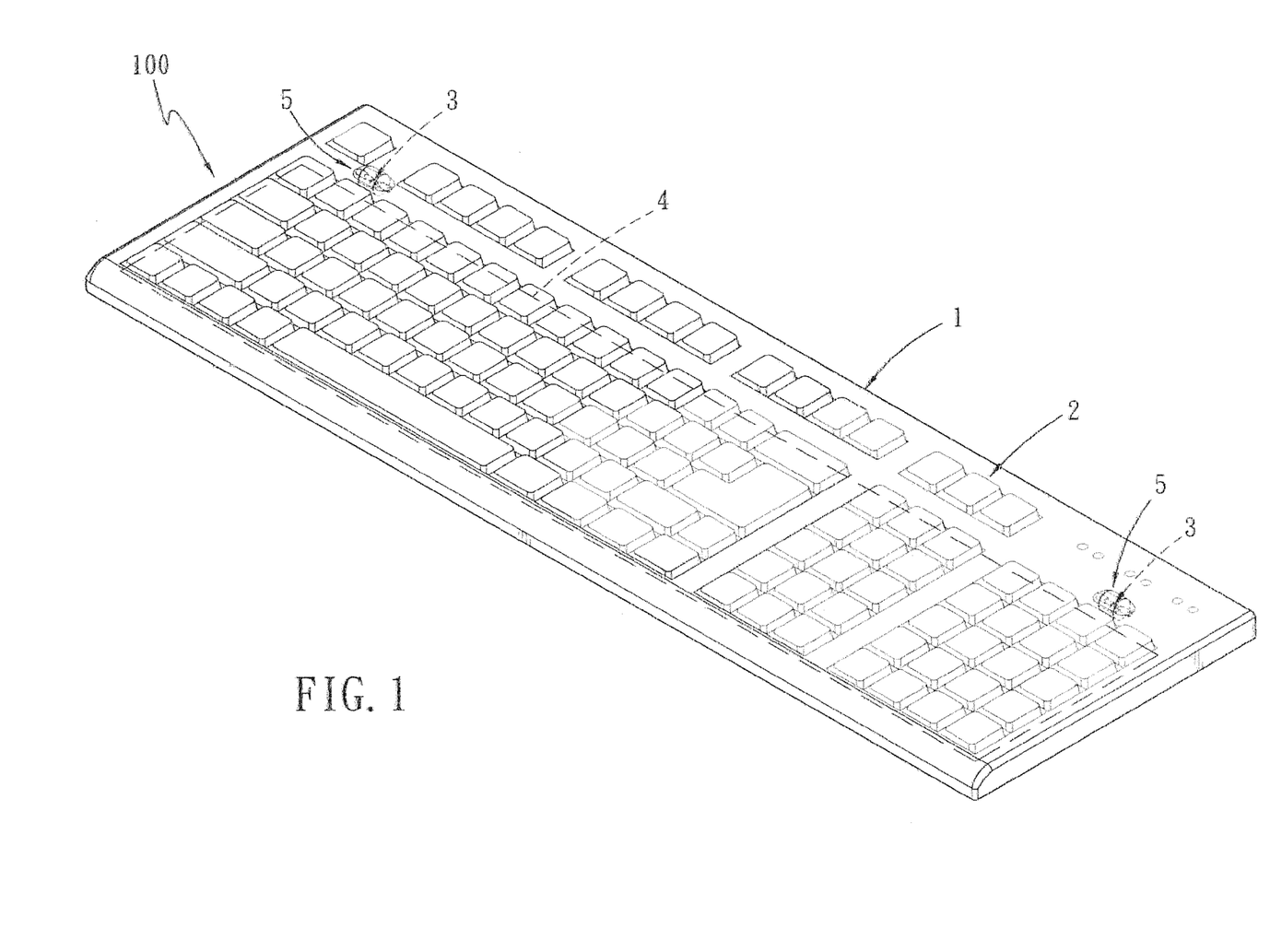
FIG. 1 is a perspective view of the first preferred embodiment of a color changeable lighting keyboard according to this invention.

Referring to FIG. 1, the first preferred embodiment of a color changeable lighting keyboard 100 according to this invention includes a housing 1, a key assembly 2, two lighting modules 3, a light-guiding plate 4, and two color changing mechanisms 5. The lighting keyboard 100 may include only one color changing mechanism 5.

Figure 2:
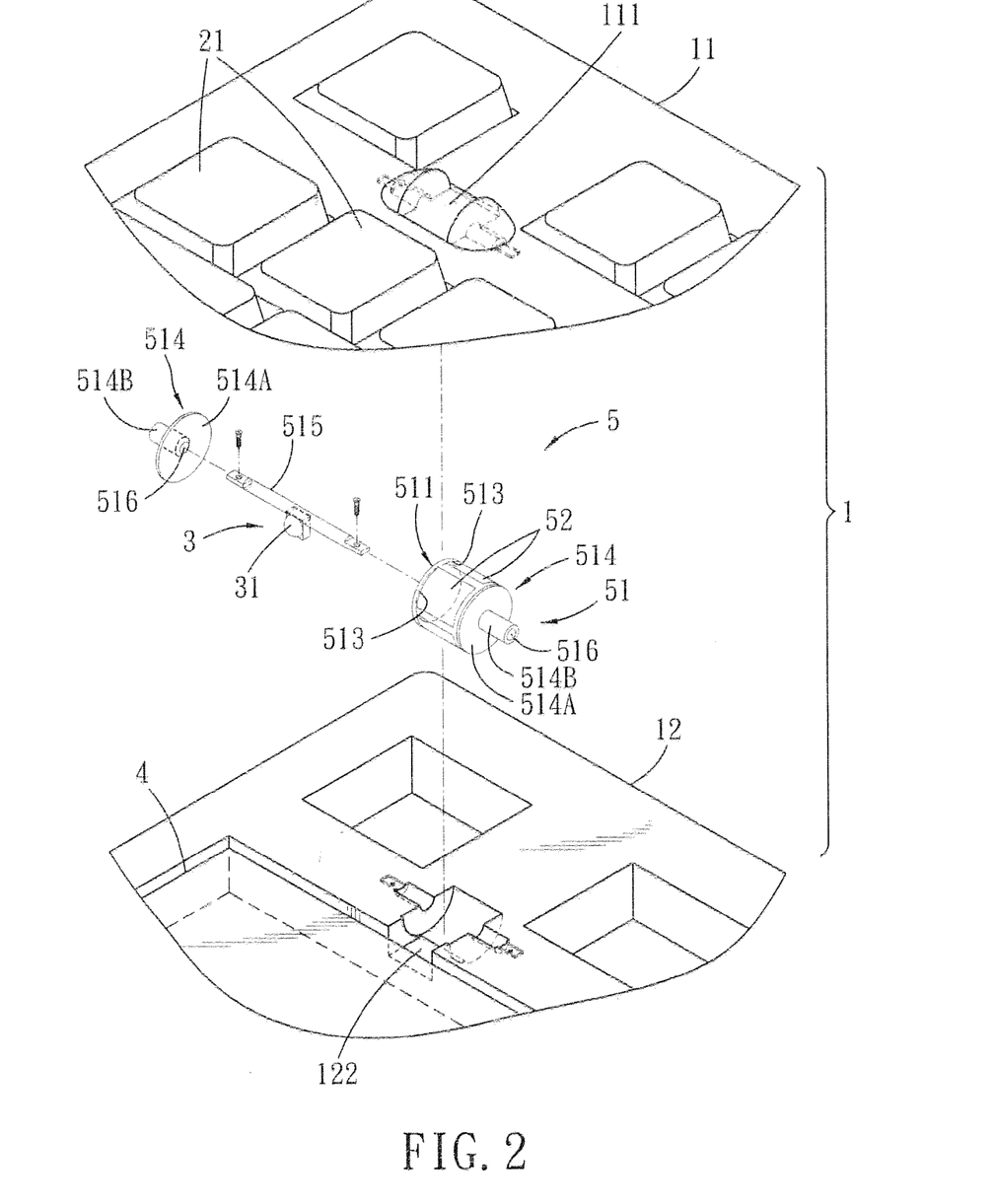
FIG. 2 is a fragmentary, partly exploded perspective view of the first preferred embodiment, illustrating that a lighting module and a color changing mechanism are disassembled.

With further reference to FIG. 2, the housing 1 can be the housing of a computer keyboard. In this embodiment, the housing 1 includes a top cover 11 and a bottom cover 12. Each of the left and right sides of the top cover 11 is formed with an opening 111 (only one is shown in FIG. 2).

The key assembly 2 includes a plurality of key caps 21, a circuit board, and a plurality of rubber domes disposed on the circuit board. The circuit board and the light-guiding plate 4 are disposed between the top cover 11 and the bottom cover 12. The key caps 21 are exposed from the top cover 11, and are aligned with the rubber domes, respectively.

Figure 5:
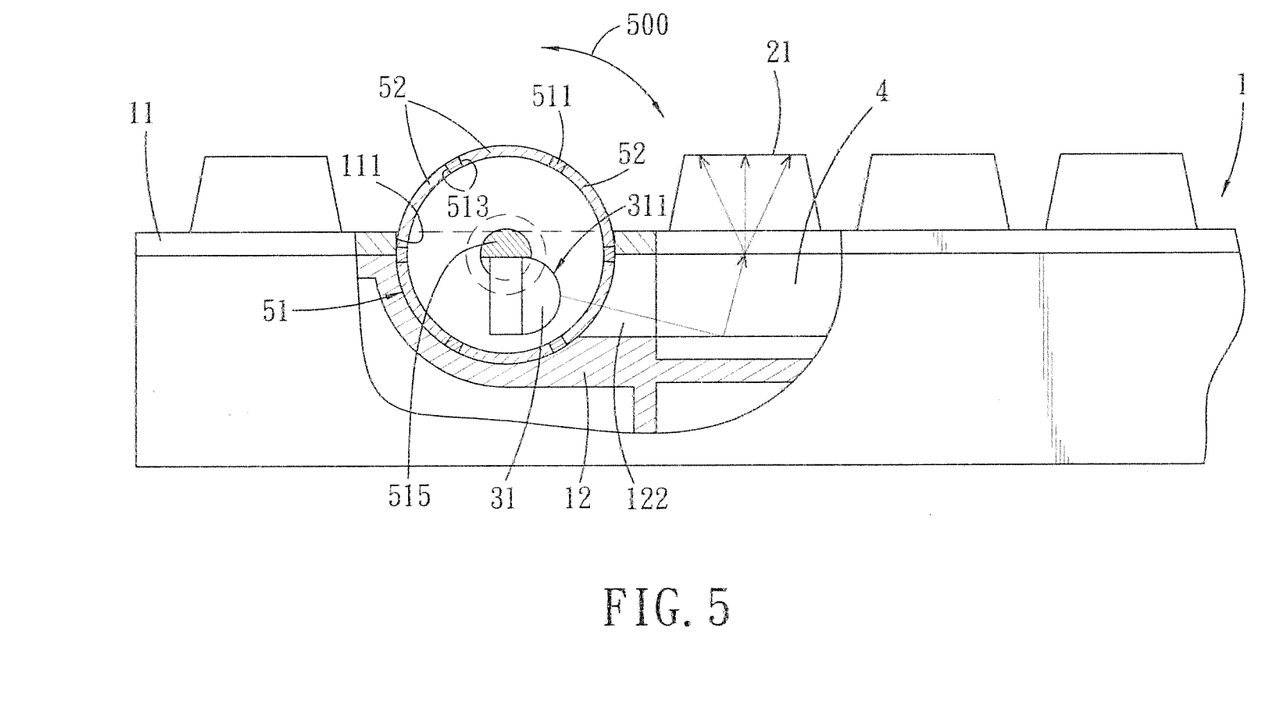
FIG. 5 is a partly sectional front view of the preferred embodiment, illustrating that light is emitted from the lighting module onto a light-guiding plate, and is reflected by the light-guiding plate onto a key cap.

The lighting modules 3 are disposed in the housing 1, and are aligned respectively with left and right side portions for lighting the key assembly 2. The positions and number of the lighting modules 3 can be changed according to actual needs and distribution of the key caps 21. Each of the lighting modules 3 includes a light-emitting element 31 having a light-emitting side 311 (see FIG. 5) that emits light toward the light-guiding plate 4, such that the light is reflected by the light-guiding plate 4 onto the key caps 21, as shown in FIG. 5.

The light-emitting elements 31 can be light emitting diode (LED) package or LED chips. Preferably, the light-emitting elements 31 are white light LEDs, However, the light-emitting elements 31 may be other types of light sources applicable to lighting keyboards.

Figure 3:
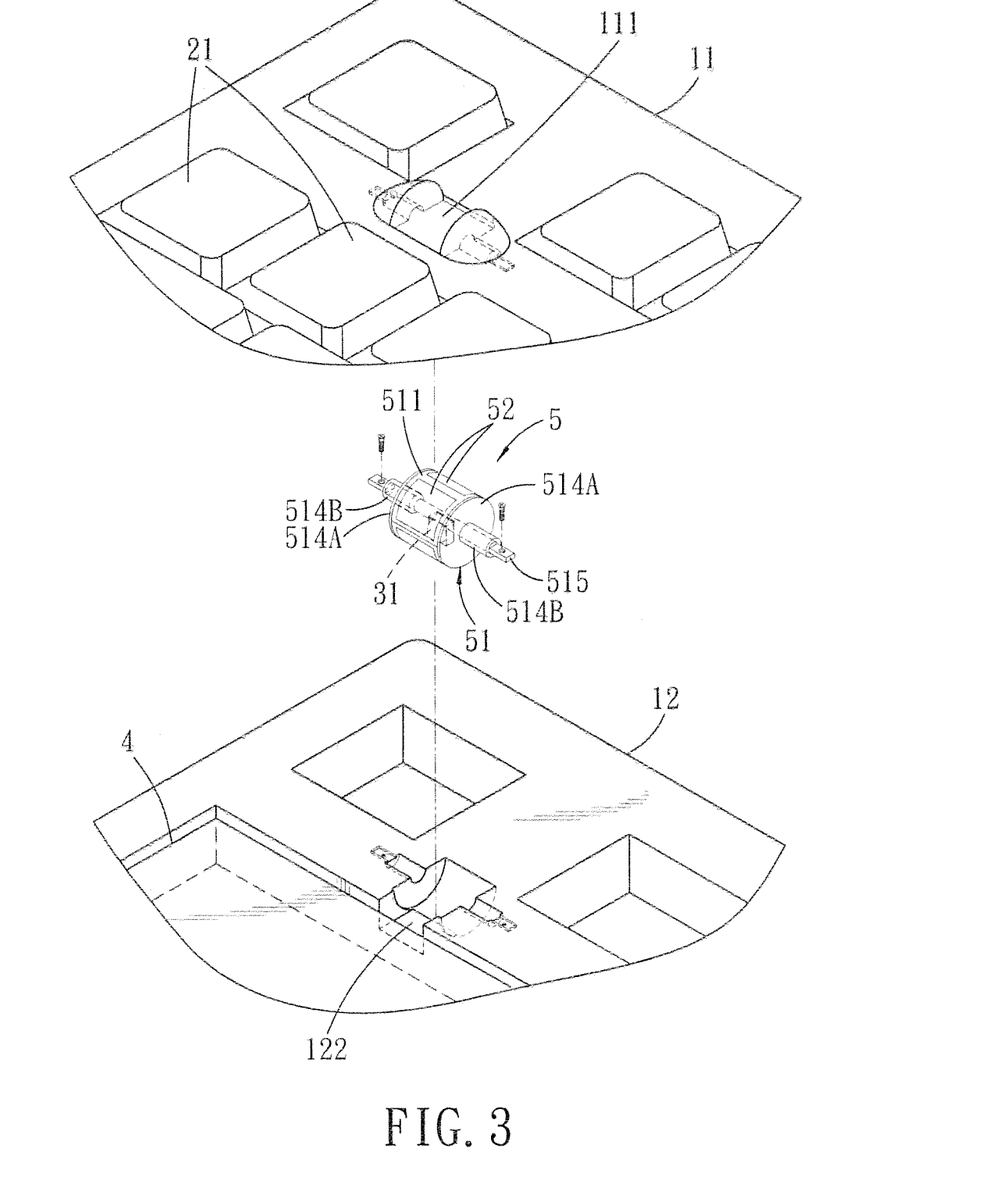
FIG. 3 is a fragmentary, partly exploded perspective view of the first preferred embodiment, illustrating that the lighting module and the color changing mechanism are assembled to each other.
Figure 4:
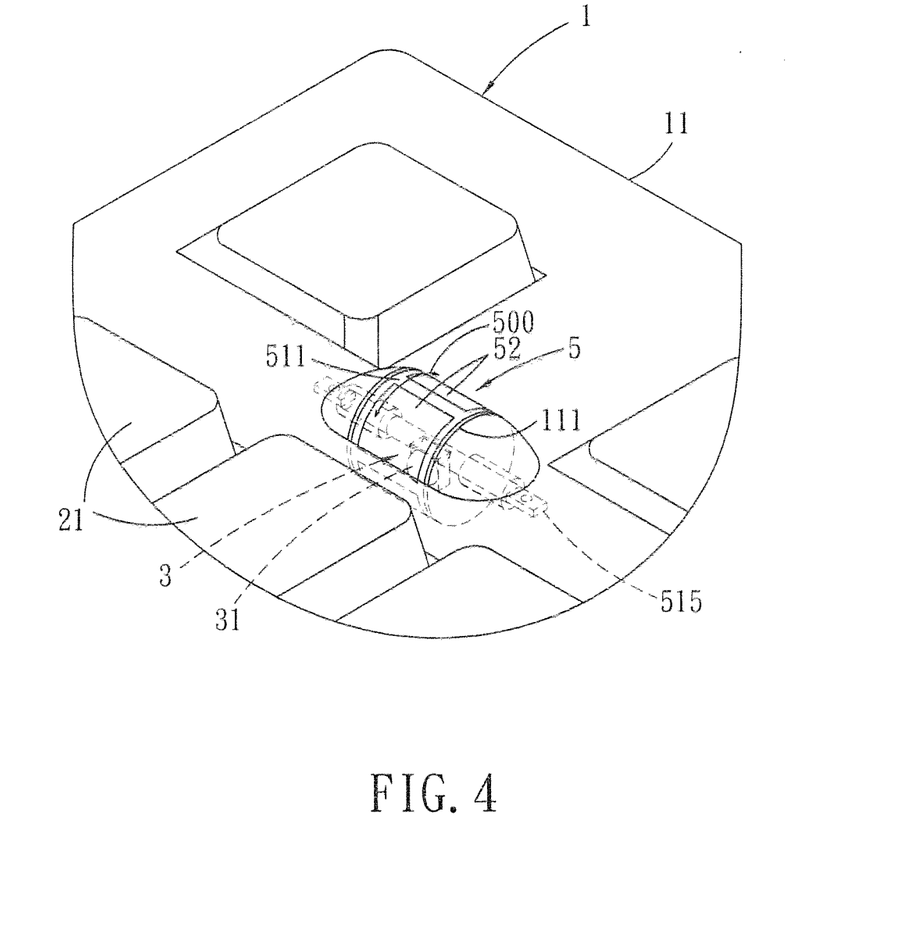
FIG. 4 is an enlarged view of a portion of FIG. 2.

The two color changing mechanisms 5 are aligned with the two lighting modules 3, respectively. Only one of the color changing mechanisms 5 and only one of the lighting modules 3 will be described hereinafter. With further reference to FIGS. 3, 4, and 5, the color changing mechanism 5 includes a movable element 51 and a plurality of colored pieces 52 disposed on the movable element 51. The colored pieces 52 have different colors, and are light-permeable. The movable element 51 is operable to perform a linear motion relative to the light-emitting element 31 along a moving direction 500. When the movable element 51 moves along the moving direction 500, the colored pieces 52 face the movable element 51 individually, so that light passing through one of the colored pieces 52 has the same color as that of the one of the colored pieces 52.

In this embodiment, the movable element 51 includes a connecting body 511 that is configured as an annular surrounding wall and that is rotatable in the housing 1. As such, the moving direction 500 is a circumferential direction of the connecting body 511. The connecting body 511 is formed with a plurality of windows 513 arranged along the circumferential direction. The colored pieces 52 are disposed on the connecting body 511, and are disposed within the windows 513, respectively. In this embodiment, the movable element 51 further includes two side pieces 514 and a shaft rod 515. Each of the side pieces 514 is formed with a side hole 516. Each of the side pieces 514 includes a side plate 514A and a tube 514B extending integrally and outwardly from a central portion of the side plate 514A, and the side hole 516 is formed through the side plate 514A and the tube 514B. Alternatively, each of the side pieces 514 may include only the side plate 514A, and the side hole 516 is formed through the side plate 514A. The connecting body 511 is connected between the two side pieces 514, and has one end connected fixedly to one of the side pieces 514, and the other end connected removably to the other one of the side pieces 514 by, e.g., lock bolts, or in a tongue-and-groove engaging manner. The shaft rod 515 extends through the side holes 516 in the side pieces 514 at two end portions thereof, and is fixed in the housing 1 (e.g., fixed on the bottom cover 12). The lighting module 3 is fixed on the shaft rod 515 between the side pieces 514, and is surrounded by the connecting body 511.

The movable element 51 is disposed within the corresponding opening 111, and is exposed partially from the housing 1 through the corresponding opening 111 for manual operation. When the connecting body 511 is rotated to drive rotational motion of the colored pieces 52 along the moving direction 500, it is aligned with the colored pieces 52 individually. Upon alignment of the connecting body 51 with one of the colored pieces 52, light is emitted from the light-emitting element 31 onto the light-guiding plate 4 through the one of the colored pieces 52, and is reflected from the light-guiding plate 4 onto the key caps 21. As such, when the user desires to change light color, it is only necessary to rotate a portion of the connecting body 511 of the movable element 51 exposed from the housing 1.

To adjust the movable element 51 accurately and conveniently to align only one of the colored pieces 52 with the light-emitting side 311 of the light-emitting element 31, an indexing mechanism can be disposed between the housing 1 and the movable element 51 (e.g., in a ratchet configuration or tongue-and-groove engaging manner), thereby allowing the corresponding movable element 51 to be rotated by a predetermined angle each time. Preferably, the housing 1 has a light transmission channel 122 formed between the light-emitting side 311 of the light-emitting element 31 and the light-guiding plate 4, such that only light passing through the one of the colored pieces 52 can be transmitted onto the light-guiding plate 4.

In view of the above, due to disposition of the movable element 51 and the colored pieces 52, light color can be adjusted manually to a desired color by operating the movable element 51 to align the light-emitting side 311 of the light-emitting element 31 with the colored piece 52 having the desired color.

In this embodiment, the connecting body 511 is connected to the light-emitting element 31 by the side pieces 514 and the shaft rod 515. Alternatively, the connecting body 511 may be connected to the light-emitting element 31 in any other suitable manners as long as the connecting body 511 can rotate relative to the housing 1.

Figure 6:
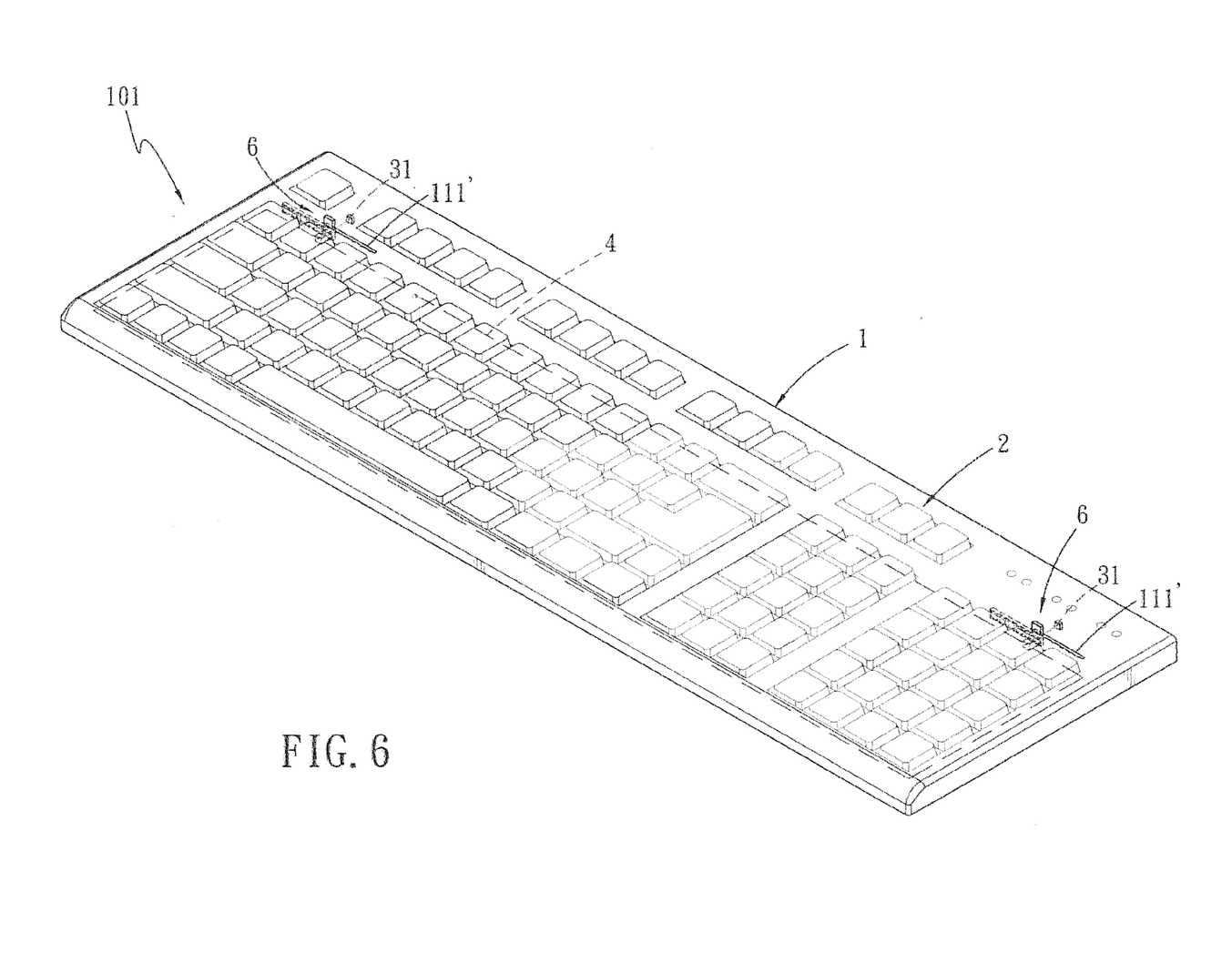
FIG. 6 is a perspective view of the second preferred embodiment of a color changeable lighting keyboard according to this invention.
Figure 7:
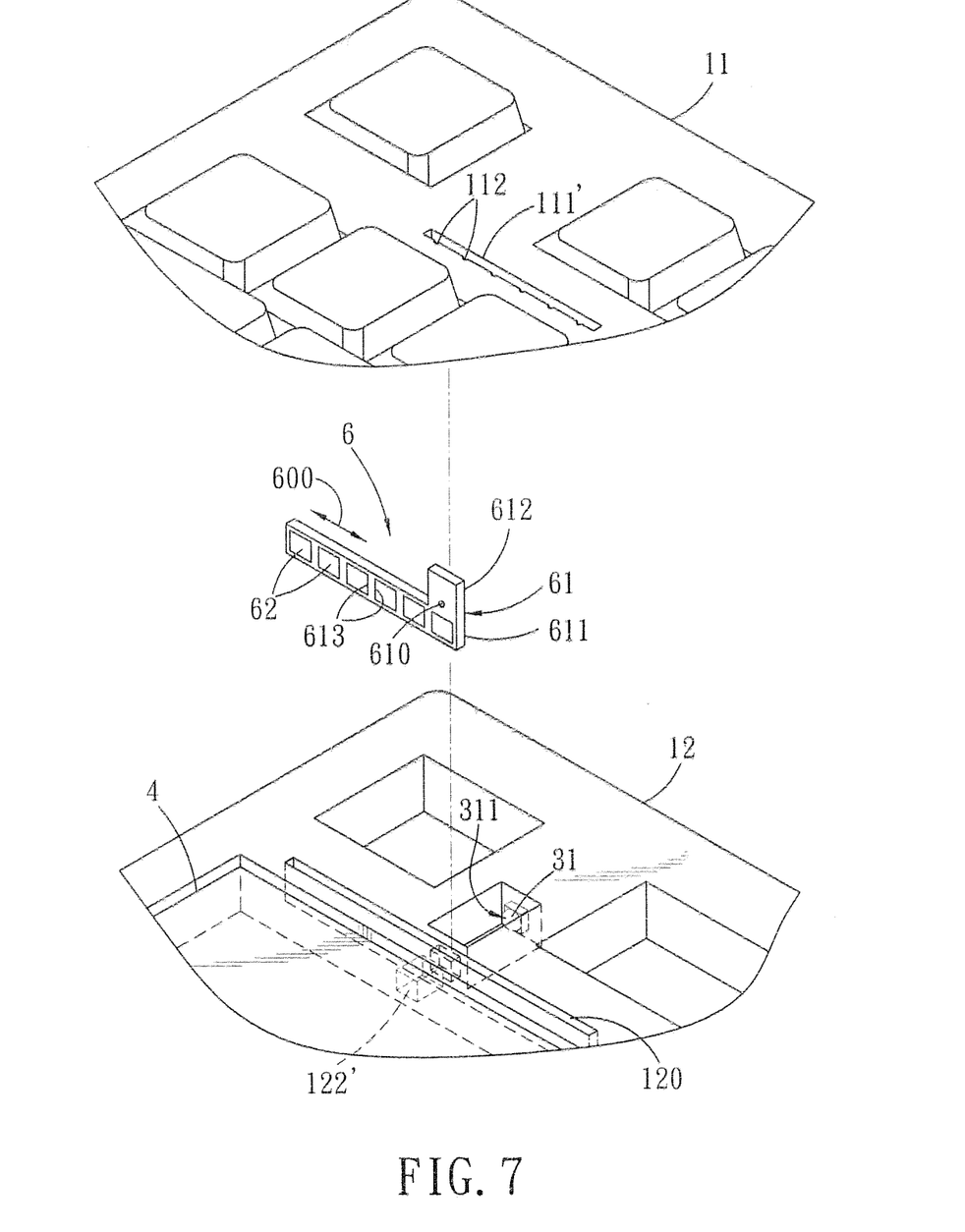
FIG. 7 is a fragmentary, partly exploded perspective view of the second preferred embodiment.
Figure 8:
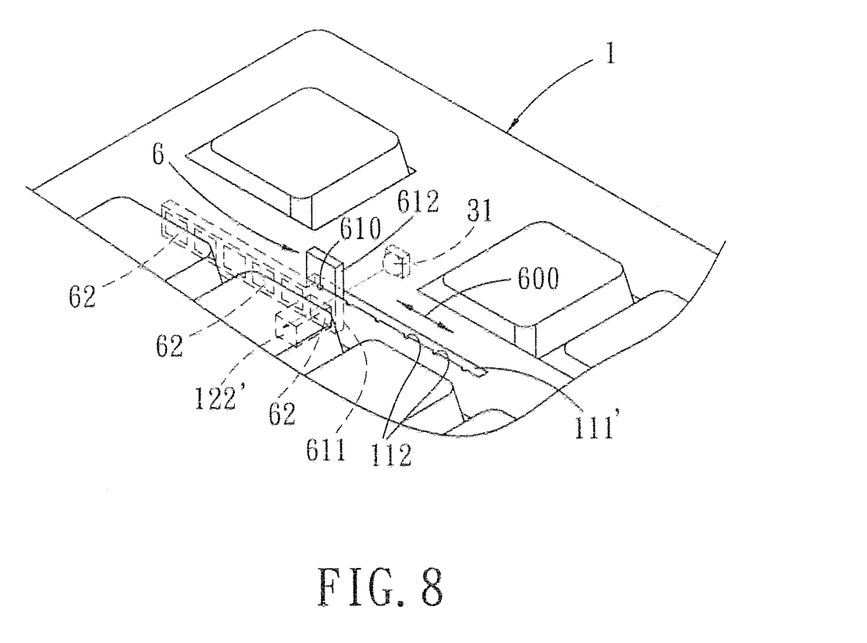
FIG. 8 is an enlarged view of a portion of FIG. 6.

FIGS. 6, 7, and 8 show the second preferred embodiment of a color changeable lighting keyboard 101 according to this invention, which differs from the first preferred embodiment in the color changing mechanisms 6. In this embodiment, each of the color changing mechanisms 6 includes a movable element 61 and a plurality of colored pieces 62. Only one of the color changing mechanisms 6 and only one of the light-emitting element 31 will described hereinafter.

The movable element 61 is located in front of the light-emitting side 311 of the light-emitting element 31, and includes a connecting body 611 and an operating portion 612 exposed from the housing 1. The connecting body 611 is configured as an elongated plate, and extends along a horizontal direction 600. The connecting body 611 is formed with a plurality of windows 613 along the horizontal direction 600. The colored pieces 62 are disposed respectively within the windows 613. The operating portion 612 is configured as a projecting plate extending upwardly from the connecting body 611. In this embodiment, each of the openings 111' in the housing 1 is configured as a guide slot, and extends horizontally. The connecting body 611 is disposed between the top cover 11 and the bottom cover 12. The extending direction of the connecting body 611 is parallel to that of the corresponding opening 111'. The operating portion 612 is exposed upwardly from the top cover 11 through the corresponding opening 111', and can be pushed to move within the corresponding opening 111'. Hence, the connecting body 611 can be moved with the operating portion 612 along the horizontal direction 600 to align a selected one of the colored pieces 62 with the light-emitting side 311 of the light-emitting element 31. As such, in this embodiment, the moving direction of the movable element 31 is the horizontal direction 600. When a change of light color is desired, the operating portion 612 is pushed to move within the corresponding opening 111' so that the connecting body 611 is moved along the horizontal direction 600 for changing light color.

Similar to the previous embodiment, in this embodiment, the housing 1 is formed with a light transmission channel 122', such that light not emitted through the selected color piece 62 can be shielded by the housing 1. In this embodiment, the movable element 61 has a first engaging portion 610 configured as a projection, and the housing 1 has a plurality of equidistant second engaging portions 112 configured as grooves, arranged along the horizontal direction (i.e., the moving direction) 600, and engageable with the first engaging portion 610. The first engaging portion 610 cooperates with the second engaging portions 112 to constitute an indexing mechanism. When the movable element 61 is pushed to move the first engaging portion 610 from one of the second engaging portions 112 into an adjacent one of the second engaging portions 112, it travels a predetermined distance (i.e., the distance between any two adjacent ones of the second engaging portions 112), thereby providing an indexing operation and preventing undesired movement of the movable element 61.

Alternatively, the moving direction of the movable element 61 may be changed. For example, the connecting body 611 is configured as a disk, and is exposed partially from the housing 1, and the colored pieces 62 are disposed around the connecting body 611. In this manner, the connecting body 611 can be operated to rotate to thereby align the light-emitting element 31 with the colored pieces 62 individually.

In view of the above, the user can operate the color changing mechanism 5, 6 with hand to drive rotational or straight-line motion of the movable elements 51, 61 to thereby cause a change to light color. Thus, the object of this invention is achieved.

As compared to the prior art including a luminescent panel, the user can adjust light color according to needs. When employed as a wired keyboard, due to the presence of a backlight driving design, the user can change light color manually without software or circuit control. When employed as a wireless keyboard, the keyboard can be provided with a built-in power source so as to allow for a change in light color without turn-on operation and operating system starting operation.

With this invention thus explained, it is apparent that numerous modifications and variations can be made without departing from the scope and spirit of this invention. It is therefore intended that this invention be limited only as indicated by the appended claims.

I claim:

1. A color changeable lighting keyboard comprising:
   a housing;
   a key assembly disposed on said housing;
   a lighting module disposed in said housing for lighting said key assembly; and
   a color changing mechanism including
      a movable element disposed in said housing and operable to perform a linear motion,
      a plurality of colored pieces made of a light-permeable material and having different colors, said movable element being operable to move said colored pieces along a moving direction to align a selected one of said colored pieces with said lighting module;
   an indexing mechanism that includes a first engaging portion disposed at said movable element, and a plurality of equidistant second engaging portions disposed at said housing, arranged along the moving direction, and engageable with said first engaging portion in a tongue-and-groove manner.

2. The color changeable lighting keyboard as claimed in claim 1, wherein said housing has an opening, and said movable element includes a connecting body having a portion exposed from said housing through said opening for manual operation, said connecting body being formed with a plurality of windows arranged along the moving direction, said colored pieces being disposed respectively within said windows.

3. The color changeable lighting keyboard as claimed in claim 2, wherein said connecting body is configured as an annular surrounding wall, the moving direction being a circumferential direction of said annular surrounding wall.

4. The color changeable lighting keyboard as claimed in claim 3, wherein said movable element further includes two side pieces and a shaft rod, said annular surrounding wall being connected between said side pieces, said shaft rod having two end portions extending respectively through said side pieces and connected fixedly to said housing in such a manner that said connecting body is rotatable about said shaft rod relative to said lighting module.

5. The color changeable lighting keyboard as claimed in claim 1, wherein said housing has an opening, and said movable element includes a connecting body and an operating portion, said connecting body being configured as an elongated plate extending along a horizontal direction constituting the moving direction, said operating portion extending upwardly from said connecting body and exposed from said housing through said opening for manual operation.

6. The color changeable lighting keyboard as claimed in claim 5, wherein said housing further has a guide slot extending along the moving direction and permitting said movable element to be disposed movably therein for guiding movement of said movable element along the moving direction.

7. The color changeable lighting keyboard as claimed in claim 1, further comprising a light-guiding plate, said lighting module including at least one light-emitting element, said light-emitting element having a light-emitting side adapted for emitting light toward said light-guiding plate, said movable element being operable to align said light-emitting side of said light-emitting element with said colored pieces one at a time.

8. A color changeable lighting keyboard comprising:
   a housing;
   a key assembly disposed on said housing;
   a lighting module disposed in said housing for lighting said key assembly; and
   a color changing mechanism including
      a movable element disposed in said housing and operable to perform a linear motion, and
      a plurality of colored pieces made of a light-permeable material and having different colors, said movable element being operable to move said colored pieces along a moving direction to align a selected one of said colored pieces with said lighting module;
   wherein said housing has an opening, and said movable element includes a connecting body and an operating portion, said connecting body being configured as an elongated plate extending along a horizontal direction constituting the moving direction, said operating portion extending upwardly from said connecting body and exposed from said housing through said opening for manual operation.

9. The color changeable lighting keyboard as claimed in claim 8, wherein said housing has an opening, and said movable element includes a connecting body having a portion exposed from said housing through said opening for manual operation, said connecting body being formed with a plurality of windows arranged along the moving direction, said colored pieces being disposed respectively within said windows.

10. The color changeable lighting keyboard as claimed in claim 8, wherein said housing further has a guide slot extending along the moving direction and permitting said movable element to be disposed movably therein for guiding movement of said movable element along the moving direction.

11. The color changeable lighting keyboard as claimed in claim 8, further comprising a light-guiding plate, said lighting module including at least one light-emitting element, said light-emitting element having a light-emitting side adapted for emitting light toward said light-guiding plate, said movable element being operable to align said light-emitting side of said light-emitting element with said colored pieces one at a time.

12. A color changeable lighting keyboard comprising:
    a housing;
    a key assembly disposed on said housing;
    a lighting module disposed in said housing for lighting said key assembly; and
    a color changing mechanism including
       a movable element disposed in said housing and operable to perform a linear motion, and
       a plurality of colored pieces made of a light-permeable material and having different colors, said movable element being operable to move said colored pieces along a moving direction to align a selected one of said colored pieces with said lighting module;
    wherein said housing has an opening, and said movable element includes a connecting body having a portion exposed from said housing through said opening for manual operation, said connecting body being formed with a plurality of windows arranged along the moving direction, said colored pieces being disposed respectively within said windows.

13. The color changeable lighting keyboard as claimed in claim 12, wherein said connecting body is configured as an annular surrounding wall, the moving direction being a circumferential direction of said annular surrounding wall.

14. The color changeable lighting keyboard as claimed in claim 13, wherein said movable element further includes two side pieces and a shaft rod, said annular surrounding wall being connected between said side pieces, said shaft rod having two end portions extending respectively through said side pieces and connected fixedly to said housing in such a manner that said connecting body is rotatable about said shaft rod relative to said lighting module.

15. The color changeable lighting keyboard as claimed in claim 12, wherein said housing further has a guide slot extending along a moving direction and permitting said movable element to be disposed movably therein for guiding movement of said movable element along the moving direction.

16. The color changeable lighting keyboard as claimed in claim 12, further comprising a light-guiding plate, said lighting module including at least one light-emitting element, said light-emitting element having a light-emitting side adapted for emitting light toward said light-guiding plate, said movable element being operable to align said light-emitting side of said light-emitting element with said colored pieces one at a time.

* * * * *